United States Patent
Su et al.

(10) Patent No.: US 12,452,391 B2
(45) Date of Patent: Oct. 21, 2025

(54) PROCESSING PARTICIPANT INPUT IN A VIRTUAL MEETING TO DETERMINE EFFECTS TO RENDER IN THE VIRTUAL MEETING

(71) Applicant: INTERNATIONAL BUSINESS MACHINES CORPORATION, Armonk, NY (US)

(72) Inventors: Jun Su, Beijing (CN); Yang Liang, Beijing (CN); Su Liu, Austin, TX (US); James Nash, Lewisville, TX (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 18/457,807

(22) Filed: Aug. 29, 2023

(65) Prior Publication Data

US 2025/0080696 A1    Mar. 6, 2025

(51) Int. Cl.
*H04N 7/15*      (2006.01)
*G06F 40/284*    (2020.01)
*G06F 40/40*     (2020.01)

(52) U.S. Cl.
CPC .......... *H04N 7/157* (2013.01); *G06F 40/284* (2020.01); *G06F 40/40* (2020.01); *H04N 7/152* (2013.01)

(58) Field of Classification Search
None
See application file for complete search history.

(56) References Cited

U.S. PATENT DOCUMENTS

| | | | |
|---|---|---|---|
| 9,485,284 B2 | 11/2016 | Jones et al. | |
| 2013/0124623 A1* | 5/2013 | Munter | H04L 65/4038 709/204 |
| 2014/0123027 A1* | 5/2014 | Kozloski | G06Q 10/1095 715/753 |
| 2016/0308920 A1 | 10/2016 | Brunsch et al. | |
| 2021/0021558 A1 | 1/2021 | Mahmoud et al. | |
| 2021/0287683 A1* | 9/2021 | Nareddy | G06F 16/3344 |

(Continued)

OTHER PUBLICATIONS

"Intelligent Meetings to Enhance Organizational Productivity," IP.com, IP.com No. IPCOM000268340D, Jan. 25, 2022, 7 pp.

(Continued)

*Primary Examiner* — Quoc D Tran
(74) *Attorney, Agent, or Firm* — Konrad , Raynes, Davda & Victor LLP; David Victor

(57) ABSTRACT

Provided are a computer program product, system, and method for processing participant input in a virtual meeting to determine effects to render in the virtual meeting. A natural language processor (NLP) processes a sentence to determine a structural representation of the sentence comprising a subject and object, which is processed to determine whether the object of the sentence comprises an object of recognition and the subject of the sentence is a participant in the virtual meeting. The structural representation of the sentence is processed to determine an attention level in response to determining that the structural representation of the sentence includes the object of recognition and the subject comprises a participant in the virtual meeting. In response to the attention level exceeding a threshold, a recognition attention effect is rendered in the virtual meeting associated with the attention level, observable by the participants of the virtual meeting.

20 Claims, 9 Drawing Sheets

(56) References Cited

U.S. PATENT DOCUMENTS

2021/0400142 A1 12/2021 Jorasch et al.
2022/0353371 A1 11/2022 Soni et al.

OTHER PUBLICATIONS

"Meeting Continuance," IP.com, IP.com No. IPCOM000254866D, Aug. 9, 2018 6 pp.
"System and Method to Organize and Tag Online Virtual Meeting Participants," IP.com, IP.com No. IPCOM000270506D, Jul. 12, 2022, 7 pp.

* cited by examiner

| Time Line | Meeting ID (302) | Agenda ID (304) | User List (306) | Time Stamp (308) | Conversation ID (310) |
|---|---|---|---|---|---|
| Time-1 | NULL | NULL | NULL | NULL | NULL |
| Time-2 | Meeting001 | Agenda00 | Susan, Mike, Peter, Rich, Glen, Diane | 10:01:30am | CV005 |
| Time-3 | Meeting001 | Agenda001 | Susan, Mike, Peter, Rich, Glen, Diane | 10:01:45am | CV005 |
| Time-4 | Meeting001 | Agenda001 | Susan, Mike, Peter, Rich, Glen, Diane | 10:01:50am | CV005 |
| Time-5 | Meeting001 | Agenda001 | Susan, Mike, Peter, Rich, Glen, Diane | 10:01:55am | CV006 |
| Time-6 | Meeting001 | Agenda001 | Susan, Mike, Peter, Rich, Glen, Diane | 10:02:05am | CV007 |
| Time-7 | Meeting001 | Agenda002 | Susan, Mike, Peter, Rich, Glen, Diane | 10:05:30am | CV020 |

FIG. 7A

| Conversation Content (312) | Recognition Subject (320) | Recognition Type (316) | Congratulation Level (314) | Recognition Attention Effect (322) | Photo Widget ID (324) |
|---|---|---|---|---|---|
| NULL | NULL | NULL | NULL | NULL | NULL |
| Mike did excellent job in the Q1 and received three innovation awards, got $5000 dollar awards in Q1 | NULL | NULL | NULL | NULL | NULL |
| Mike did excellent job in the Q1 and received three innovation awards, got $5000 dollar awards in Q1 | Mike | Recognition | NULL | NULL | NULL |
| Mike did excellent job in the Q1 and received three innovation awards, got $5000 dollar awards in Q1 | Mike | Recognition | 11 | Golden Background | Widget (Mike) |
| Congratulations, Mike! | Mike | Congratulation | 12 | Centralized Position and Enlarged Size | Widget (Mike) |
| Good Job, Mike! | Mike | Celebration | 13 | Jiggle | Widget (Mike) |
| Let's Review Design XYZ | Null | Null | Null | NULL | NULL |

FIG. 7B

PROCESSING PARTICIPANT INPUT IN A VIRTUAL MEETING TO DETERMINE EFFECTS TO RENDER IN THE VIRTUAL MEETING

BACKGROUND OF THE INVENTION

1. Field of the Invention

The present invention relates to a computer program product, system, and method for processing participant input in a virtual meeting to determine effects to render in the virtual meeting.

2. Description of the Related Art

A virtual meeting is a meeting that takes place remotely, using communication technology to connect participants who are not in the same physical location. It allows people to collaborate, discuss, and make decisions without the need for everyone to be in the same room. Virtual meetings have become increasingly popular in recent years, particularly in the wake of the COVID-19 pandemic, which has led to a surge in remote work and remote collaboration. Virtual meetings offer many benefits, including increased flexibility, reduced travel costs, and the ability to connect with people from anywhere in the world. Participants in a virtual meeting may be represented by avatars in a virtual conference room. Alternatively, a real-time image of the participants may be rendered in frames in the virtual meeting.

SUMMARY

Provided are a computer program product, system, and method for processing participant input in a virtual meeting to determine effects to render in the virtual meeting. A natural language processor (NLP) processes a sentence to determine a structural representation of the sentence comprising a subject and object. The structural representation of the sentence is processed to determine whether the object of the sentence comprises an object of recognition and the subject of the sentence is a participant in the virtual meeting. The structural representation of the sentence is processed to determine an attention level in response to determining that the structural representation of the sentence includes the object of recognition and the subject comprises a participant in the virtual meeting. In response to the attention level exceeding a threshold, a recognition attention effect is rendered in the virtual meeting associated with the attention level, observable by the participants of the virtual meeting, to direct attention of the participants of the virtual meeting toward the participant that is the subject of the sentence.

BRIEF DESCRIPTION OF THE DRAWINGS

FIGS. 7A and 7*b* illustrate an example of a conversation log of sentences processed in the virtual meeting.

DETAILED DESCRIPTION

Figure 1:
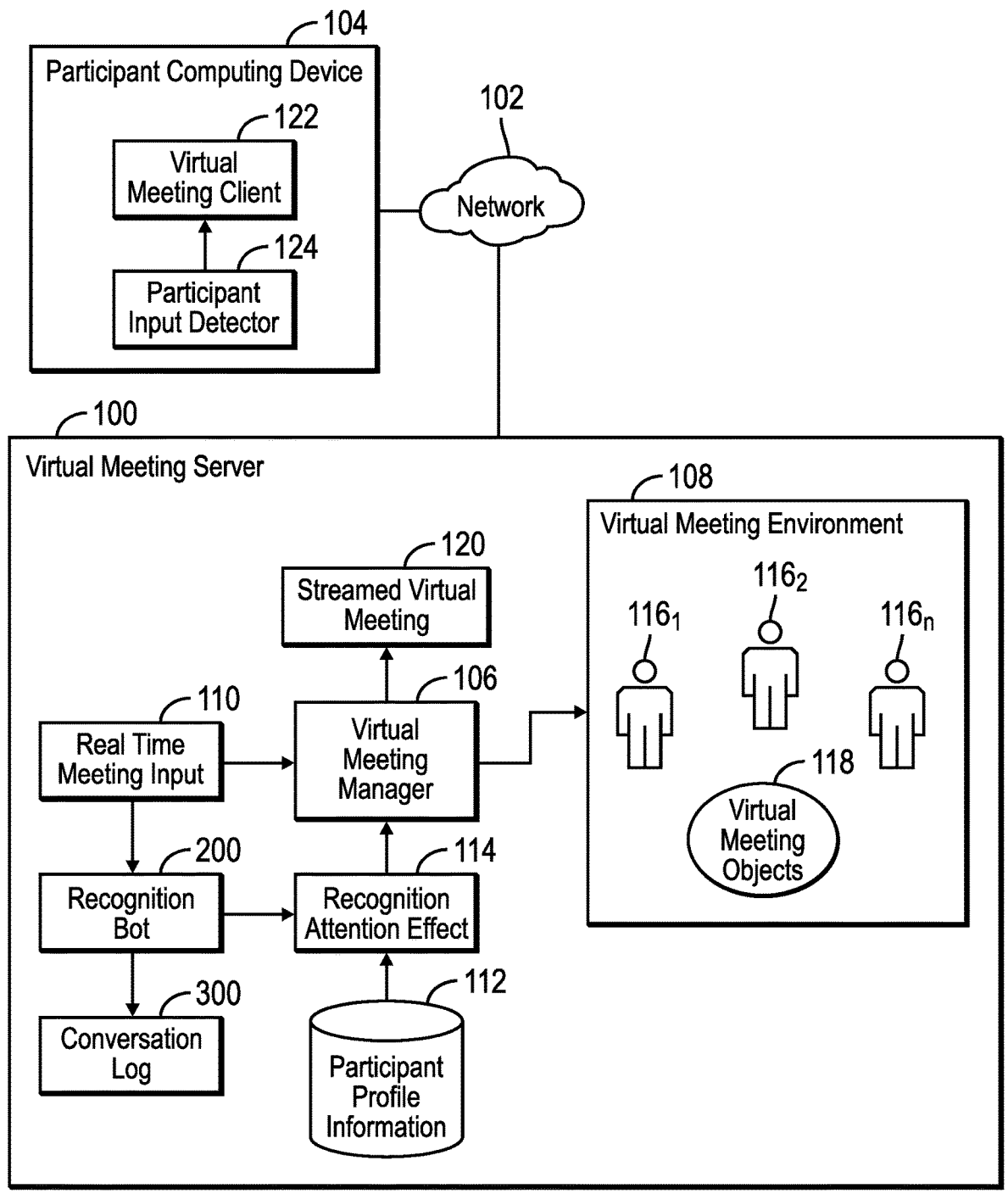
FIG. 1 illustrates an embodiment of a computing environment to generate a virtual meeting.

The description herein provides examples of embodiments of the invention, and variations and substitutions may be made in other embodiments. Several examples will now be provided to further clarify various embodiments of the present disclosure:

Example 1: A computer-implemented method for generating information in a virtual meeting having participants. The method further comprises processing, by a natural language processor (NLP), a sentence provided to determine a structural representation of the sentence comprising a subject and object. The method for comprises processing the structural representation of the sentence to determine whether the object of the sentence comprises an object of recognition and the subject of the sentence is a participant in the virtual meeting. The method for comprises processing the structural representation of the sentence to determine an attention level in response to determining that the structural representation of the sentence includes the object of recognition and the subject comprises a participant in the virtual meeting. The method for comprises, in response to the attention level exceeding a threshold, rendering a recognition attention effect in the virtual meeting associated with the attention level, observable by the participants of the virtual meeting, to direct attention of the participants of the virtual meeting toward the participant that is the subject of the sentence. Thus, embodiments advantageously allow for improving the computational processing efficiency of determining to render recognition attention effects for those circumstances in which it is determined that the attention level exceeds a threshold and the subject of the sentence comprises a participant in the virtual meeting. Embodiments further advantageously allow for autogenerating a recognition attention affect by processing, using NLP, sentences provided by participants in a virtual meeting to determine whether there is an object of recognition in the sentence and the subject is a person and participant to recognize in the virtual meeting to improve the human-computer interaction during the virtual meeting by providing immediate, auto generated feedback into the meeting to render attention effects during a virtual meeting.

Example 2: The limitations of any of Examples 1 and 3-9, where the method further comprises that the attention level and the recognition attention effect are associated with an attention type that is a member of attention types consisting of: congratulatory attention; derisive attention; sarcastic attention; disapproval attention; cautionary tale attention; and notification attention. Thus, embodiments advantageously allow for improving the computational processing efficiency of determining recognition attention effects by having the determinations of attention effects for those types of attention that are of interest to participants of a virtual meeting, and to further improve the human-computing interaction by providing attention effects for attention types of most interest to participants of the virtual meeting.

Example 3: The limitations of any of Examples 1 and 4-9, where the method further comprises that the structural representation of the sentence further includes an adjective and the NLP further determines a value associated with the object of recognition. The method further comprises that the determining the attention level further comprises processing the object, adjective, and value in the structural representation of the sentence to determine object points, sentiment points, and value points and determining, by an attention level classifier, the attention level as a function of the object points, the sentiment points, and the value points. Thus, embodiments advantageously optimize processing because the processing of the different elements may be done in parallel to reduce processing latency in outputting the elements before they are processed by a congratulation level classifier.

Example 4: The limitations of any of Examples 1-3 and 5-9, where the method further comprises processing, by an object classifier machine learning model, the object to output the object points from input comprising the object in the sentence. The method further comprises processing, by a sentiment analyzer machine learning model, the adjective to output the sentiment points from input comprising the adjective in the sentence. The method further comprises processing, by a value classifier machine learning model, a value for the object in the sentence to output the value points from input comprising the value for the object in the sentence. Thus, embodiments advantageously optimize computational processing efficiency by utilizing different machine learning models to separately and in parallel process the elements used to determine the points used to produce the attention level to reduce latency in outputting the elements to the attention level classifier to determine the attention level.

Example 5: The limitations of any of Examples 1-4 and 6-9, where the method further comprises processing, by an object of recognition classifier, comprising a machine learning model, input comprising the object in the sentence and attributes of the object in the sentence to classify the object in the sentence as an object of recognition or not an object of recognition. The method further comprises that the operations of determining the attention level, determining whether the attention level exceeds the threshold, and the rendering the recognition attention effect are performed in response to determining that the object in the sentence comprises the object of recognition. Thus, embodiments optimize computational processing by having the machine learning model classify the object as an object of recognition or not an object of recognition, and only perform the operations of determining the attention level, determining whether the attention level exceeds the threshold, and the rendering the recognition attention effect to avoid unnecessary processing when the object of the sentence is not an object of recognition.

Example 6: The limitations of any of Examples 1-5 and 7-9, where the method further comprises providing an attention effect mapping associating different attention levels with different attention effects to render in the virtual meeting. The method further comprises that a first attention level, which is higher than a second attention level, is associated with a first attention effects that provides more noticeable effects in the virtual meeting than a second attention effect associated with the second attention level. Thus, embodiments advantageously automate level of recognition attention effects to produce based on the calculated attention level, so that higher attention levels provide more noticeable recognition attention effects to ensure that the system automatically generates the appropriate relative recognition effect to improve the human-computer interaction in a virtual meeting.

Example 7: The limitations of any of Examples 1-6, 8, and 9, where the method further that the recognition attention effect specifies visualization modifications of a representation of the participant that is the subject of the sentence to draw participants' attention to a widget representing the participant that is the subject of the sentence. Thus, embodiments advantageously improve the human computer interaction by providing visual modifications to the representation of the participant that is the subject to the sentence that are readily noticeable to participants in the meeting and effectively draw attention to the particular person to provide an automated and computationally efficient mechanism to improve the human-computer interaction.

Example 8: The limitations of any of Examples 1-7 and 9, where the method further comprises summarizing, by a text summarizer NLP, the sentence to output a summary of the sentence identifying the subject, the object of recognition associated with the subject, and a value associated with the object of recognition. The method further comprises rendering the summary of the sentence with the rendering of the recognition attention effect in the virtual meeting. Thus, embodiments advantageously provide the use of additional NLP technology to improve the human-computer interaction by providing participants a summary of the sentence to provide an efficient mechanism to provide additional information on the attention effect being rendered during the virtual meeting.

Example 9: The limitations of any of Examples 1-8, where the method further comprises generating a conversation log entry in a conversation log for each sentence processed in the virtual meeting to include: a content of the sentence; the structural representation of the sentence; indication of whether the sentence includes an object of recognition; indication of whether the subject of the sentence comprises an participant of the virtual meeting; a recognitive attention effect if the sentence includes the object of recognition; and a timestamp of when the sentence was presented to the virtual meeting, wherein the recognition attention effect indicated in the conversation log entry is rendered in the virtual meeting to highlight the object of recognition for the participant to recognize. Thus, embodiments advantageously provide an optimal data structure to log information on conversations during the virtual meeting to process to determine the most appropriate form of recognition attention effect to render to improve the human-computer interaction and overall virtual meeting experience to encourage users to continue to support using this technology. The data structure on the log of conversations may further be used to train the machine learning models.

Example 10 is an apparatus comprising means to perform a method as described in preceding Examples 1-9.

Example 11 is a machine-readable storage including machine-readable instructions, when executed, to implement a method or realize an apparatus in preceding Examples 1-9.

Additionally or alternatively, an embodiment in which the element of Example 1 of determining a attention level for the object of recognition may be determined by having a machine learning model directly process as input the structural representation of the sentence comprising a subject, verb, object and adjective and participant information on the meeting to directly determine to not produce a recognition attention affect or output the recognition attention affect to render. This arrangement improves computer processing by reducing the number of processing steps and components, and utilizes a single machine learning model to improve computational efficiency.

Additionally or alternatively, the element of Example 1 for processing the structural representation of the sentence to determine whether the object of the sentence comprises an object of recognition may comprise an object of recognition classifier, and the element of Example 1 for processing the structural representation of the sentence to determine an attention level may comprise at least one machine learning model to produce points for components of the structural representation of the sentence indicating a strength of attention used to determine the attention level. In such machine learning model, the machine learning model may comprise neural networks that may be trained using backward propagation to adjust weights and biases at nodes in a hidden layer to produce their output based on the received inputs comprising the structural representation of the sentence. In backward propagation used to train a neural network machine learning module, biases at nodes in the hidden layer are adjusted accordingly to produce the desired output comprising a classification indicating whether the object of the sentence comprises an object of recognition and the desired output comprising points indicating a strength of the attention used to determine the attention level. This training optimizes the operations of the machine learning models to accurately produce the desired outputs based on inputs comprising elements of the structural representation of the sentence.

Virtual meetings often involve team recognition and celebrations. However, the process of recognizing and celebrating team members in virtual meetings can be challenging and time consuming, especially when there are multiple meeting participants. Existing technologies such as Webex® and Zoom®, and other similar platforms, have features that allow users to manually spotlight a user's video feed, but there is currently no automated way to do so. For instance, in a WebEx conference meeting, users may manually manipulate the user interface to place one user's image at the central stage to celebrate and achievement. Existing technologies require manual operations and do not offer an intelligent way to recognize and celebrate team members. (Webex is a trademark or registered throughout the world of Cisco Systems Inc.; Zoom is a trademark or registered throughout the world of Zoom Video Communications, Inc.)

Provided are improvements to the computer technology of human-computer interaction analysis to provide an automated recognition bot disposed in a virtual meeting server to monitor for sentence input to the virtual meeting describing certain types of objects of recognition for which different attention effects are provided to render in the virtual meeting to draw attention to an object of recognition and meeting participant to recognize. This allows for recognition, celebration, and acknowledgment of participants in the meeting that have made noteworthy accomplishments, such as awards, or reached certain work and life milestones worthy of recognition and accolades.

Described embodiments use natural language processing (NLP) to extract names of recognized virtual meeting participants and to locate their photo widgets in the virtual meeting to draw attention to the representation of the participant to recognize in the virtual meeting. Described embodiments provide a series of machine learning NLPs and classifiers to monitor sentences inputted into the virtual environment and determine an attention level for the recognition to attribute to the participant that is the subject of the sentence. The congratulation level is then used to determine a recognition attention effect corresponding to the attention level to render in the virtual meeting to draw attention to the participant that is the subject of the sentence.

FIG. 1 illustrates an embodiment of a virtual meeting server 100 in communication over a network 102 with a participant computing device 104 of a participant in a virtual meeting maintained by the virtual meeting server 100. The participant computing device 104 may be coupled to a monitor or an extended-reality display, e.g., augmented reality or virtual reality glasses, to render the virtual meeting to the participant. There may be multiple instances of the participating computing device 104 for the multiple participants in the virtual meeting.

The virtual meeting server 100 includes a virtual meeting manager 106 that generates a virtual meeting environment 108 based on real-time meeting input 110 received from participant computing devices 104 and participant profile information 112 providing information on participants of a virtual meeting and their avatars to render in a virtual meeting. The virtual meeting server 100 further includes a recognition bot 200, such as an autonomous program, that processes the real-time meeting input 110 from the meeting and determines whether a participant in the meeting is subject to recognition or accolades for an accomplishment, milestone, activity, workplace or life accomplishment, etc. The term "object of recognition" as used herein refers to an object in a sentence referencing an aspect of the life of a participant to recognize, such as an award, noteworthy accomplishment, milestone, that should be subject to some level of attention or recognition, including for attention types comprising congratulatory attention, derisive attention, sarcastic attention, disapproval attention, cautionary tale attention; and notification attention, etc. The "participant to recognize", as used herein, refers to the participant in the meeting that is the subject of the sentence and is to receive a type of attention. In alternative embodiments, the participant to recognize may be a person not a participant in the virtual meeting environment 108.

The recognition bot 200 determines whether the real-time meeting input 110 conversation, in the form of audio or text, references an object of recognition for a participant of the virtual meeting. If the conversation in the virtual meeting references an object of recognition for a participant to recognize, then the recognition bot 200 generates a recognition attention effect 114 comprising commands to cause the virtual meeting manager 106 to render an effect in the virtual meeting environment 108 to highlight and draw participant attention to the object of recognition and participant to recognize during the virtual meeting environment 108. The recognition attention effect 114 may comprise a command to control the virtual meeting manager 106 to render some form of audio announcement of object recognition, visualizations to draw participants' attention to the object of recognition and participant to recognize, such as visualization graphics highlighting the representation of the participant to recognize in the virtual meeting, such as graphical highlights of an image, graphical widget or avatar of the participant to recognize.

Based on the received inputs 110, 112, and 114, the virtual meeting manager 106 renders the virtual meeting environment 108. The virtual meeting environment 108 may render a virtual representation of a meeting among participants $116_1, 116_2 \ldots 116_n$ represented by their avatars. The virtual meeting manager 106 may render virtual meeting objects 118, including a table, chairs for the participant avatars, environmental designs in the meeting, etc. In further embodiments, the representations of the participants $116_1$, 116$_2$ ... 116$_n$ in the meeting may comprise a picture of the participant or a real-time video feed of the participant 116$_i$ in a participant frame, e.g., window, rendered in the virtual meeting environment 108. The virtual meeting manager 106 generates a streamed virtual meeting 120 to stream to the participant computing devices 104.

The recognition bot 200 may further generate a conversation log 300 having entries for instances of input sentences from the participants 116$_1$, 116$_2$ ... 116$_n$ of the virtual meeting environment 108 indicating whether input sentences, in the form of audio or text input, includes objects of recognition for participants to recognize presented during the virtual meeting environment 108. The participant providing a sentence of an object of recognition for a participant to recognize may be from a moderator of the meeting or a corporate bot supervising the meeting to insert objects of recognition into the meeting to provide accolades of participants who have done or realized something noteworthy.

The participant computing device 104 may include a virtual meeting client 122 to receive a streamed virtual meeting 120 from the virtual meeting manager 106 to render the streamed virtual meeting 120 to the user at the participant computing device 104, such as on a display screen or an extended-reality display, augmented reality, virtual reality, etc. A participant input detector 124 may receive participant input and interaction with the virtual meeting 126, such voice from a microphone, selections via a computer mouse, keyboard, game controller, other input controller, hand motion signals detected from a data or smart glove, etc. The virtual meeting client 122 may interpret this participant input with respect to the participant avatar 128$_i$ in the virtual meeting 126 and forward to the virtual meeting manager 106 to render in the virtual meeting environment 108 for other participants to observe.

Figure 2:
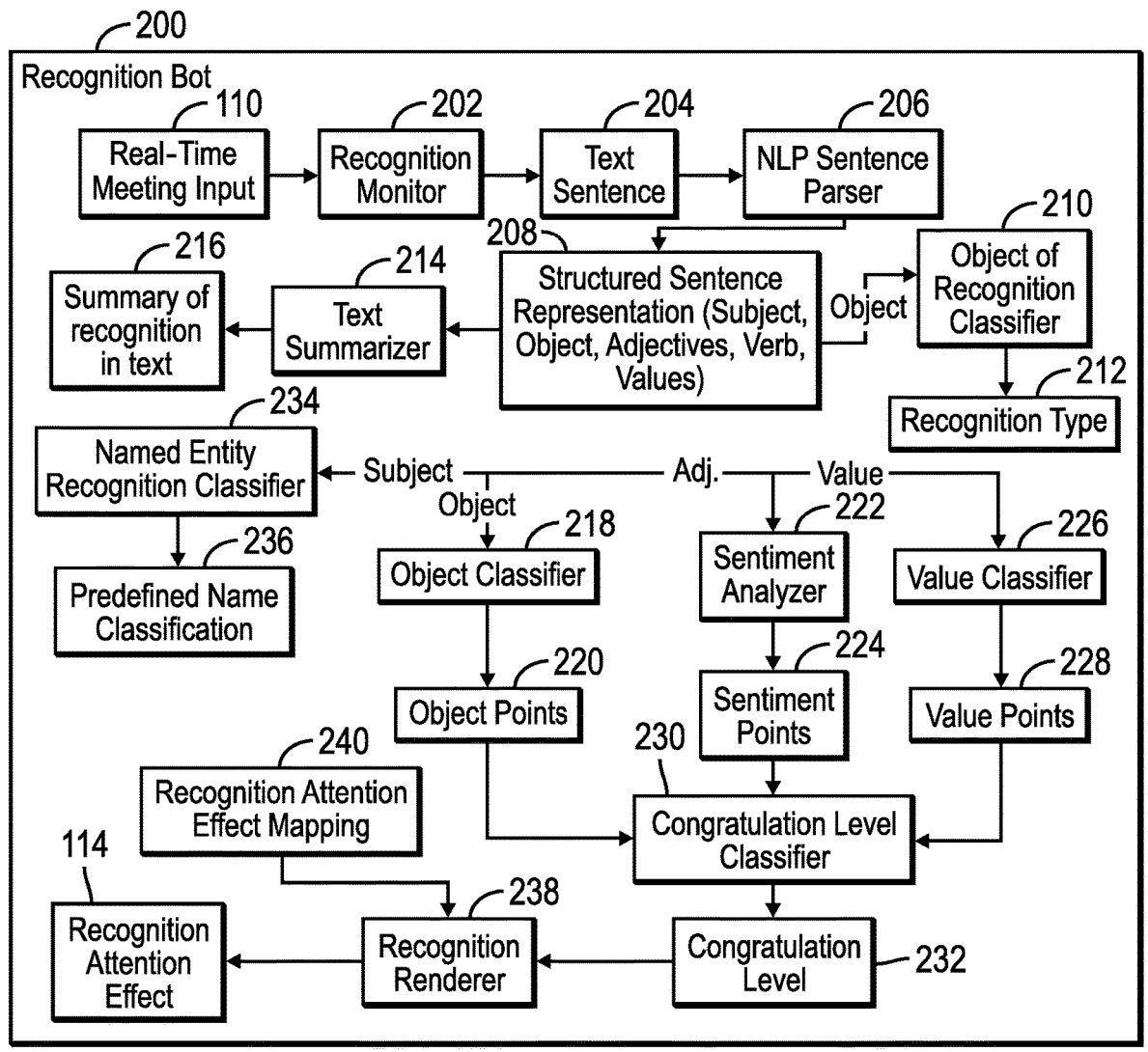
FIG. 2 illustrates an embodiment of a recognition bot to generate recognition attention effects for participants to recognize for accomplishments or milestones.

FIG. 2 illustrates an embodiment of the recognition bot 200. A recognition monitor 202 processes real-time meeting input 110 to extract text sentences 204 from the real-time meeting input 110. If the real-time meeting input 110 comprises audio of conversations, then the recognition monitor 202 converts the audio to text to process to extract sentences using natural language processing (NLP). An NLP sentence parser 206 processes the text sentence 204 to generate a structured sentence representation 208 comprising a subject, object, adjectives, verb and other sentence elements, such as value attributes of the object, prepositions, etc. An object of recognition classifier 210, comprising a machine learning model classifier, classifies the object of the text sentence 204 as comprising an object of recognition or not an object of recognition, which is outputted in a recognition type 212.

The recognition bot 200 further includes the following components to process the structured sentence representation 208, including: a text summarizer 214 to receive as input the structured sentence representation 208 to output a summary of recognition in the text 216, including the participant to recognize, the noteworthy act or milestone, i.e., object of recognition, and attributes of the object of recognition, such as values provided for the object and adjectives describing the object of recognition or participant to recognize; an object classifier 218 comprising a machine learning model trained to output object points 220 for different objects of recognition, where objects to recognize of greater importance are assigned more points, such as a nationally recognized award or recognition, versus a departmental mention; a sentiment analyzer 222, comprising a machine learning model, to process adjectives and other elements of the structured sentence representation 208 to output sentiment points 224 indicating a strength of the sentiment toward the subject and/or object of recognition in the sentence, such as mild praise through ebullient praise of the object of recognition; and a value classifier 226, comprising a machine learning model, to output value points 228 indicating a quantization of a value associated with the object, such as an amount of an award, a hierarchical ranking of the prize the participant received, e.g., first place, second place, etc.; and a congratulation level classifier 230, or other type of attention level classifier, may comprise a machine learning model or rule based model, to process the object points 220, sentiment points 224, and value points 228 to output a congratulation level 232 (or other attention type level) indicating a strength or extent of attention, such as congratulation, celebration, criticism, notification, that are appropriate for the object of recognition for the participant to recognize; and a named entity recognition classifier 234, which may comprise a machine learning model, that receives as input the subject of the structured sentence representation 208 to classify as a predefined name classification 236, such as a person name, organization, etc.

The recognition bot 200 further includes a recognition renderer 238 that receives as input the congratulation level 232 and may lookup a recognition attention effect to output 114 corresponding to the congratulation level 232 in an attention effect mapping 240. The output recognition attention effects 114 may indicate how the virtual meeting environment 108 rendering should be modified to draw participant attention to the object of recognition and participant to recognize. The attention effect may comprise audio rendered in the virtual meeting environment 108 providing the summary of recognition 216 and/or a graphic visualization rendered in the virtual meeting environment 108 to highlight a representation of the participant to recognize in the virtual meeting environment 108, such highlighting their avatar or image, according to predefined highlight styles (resize, centralize, jiggle, blink photo/avatar, change colors of background/border, change font style and size of the participate names, display a congratulatory message or other attention information for other types of attention, including derisive attention, disapproval attention, notification and informational attention, etc.

In the described embodiments, the object of recognition was processed to determine a congratulation level. In further embodiments, the object of recognition may be processed to determine attention types other than congratulations for the person that is the subject of the sentence, including, but not limited to, attention types comprising praiseworthy attention; derisive attention; sarcastic attention; disapproval attention; cautionary tale attention; informational attention; instructive attention; educational attention; notification attention, etc. In this way, the congratulation level classifier 230 may comprise an attention level classifier to generate an attention level 232 for types of attention to recognize other than congratulations. In such additional embodiments, the recognition renderer 238 may determine a recognition attention effect 114 associated with the attention level 232 in the attention effect mapping 240. The attention effect rendered may be optimally suited for different attention types, including congratulatory attention and/or for types of attention related to purposes other than congratulations.

In the recognition attention effect mapping 240, the recognition attention effects for higher congratulation levels may provide bolder and more prominent attention effects than the recognition attention effects for lower congratulation levels. For instance, attention effects for higher congratulation levels may provide more noticeable and attention getting visualizations and audio than the recognition attention effects for lower congratulation levels.

In one embodiment, the congratulation level classifier 230 may comprise an algorithm to sum the points 220, 224, and 228 to produce the congratulation level 232. In one embodiment, the recognition renderer may comprise a machine learning model trained to output different recognition attention effects for different configuration levels.

The network 102 may comprise a network such as a Storage Area Network (SAN), Local Area Network (LAN), Intranet, the Internet, Wide Area Network (WAN), peer-to-peer network, wireless network, arbitrated loop network, etc.

The arrows shown in FIGS. 1 and 2 between the components and objects in the virtual meeting server 100, the participant computing device 104, and the recognition bot 200 represent a data flow between the components.

Generally, program modules, such as the program components 106, 108, 122, 200, 202, 206, 210, 214, 218, 222, 226, 230, 234, 238, among others, may comprise routines, programs, objects, components, logic, data structures, and so on that perform particular tasks or implement particular abstract data types. The program components and hardware devices of the systems 100, 104, 200 may be implemented in one or more computer systems, where if they are implemented in multiple computer systems, then the computer systems may communicate over a network.

The program components 106, 108, 122, 200, 202, 206, 210, 214, 218, 222, 226, 234, 230, 234, 238, among others, may be accessed by a processor from memory to execute. Alternatively, some or all of the program components 106, 108, 122, 200, 202, 206, 210, 214, 218, 222, 226, 234, 230, 234, 238, among others, may be implemented in separate hardware devices, such as Application Specific Integrated Circuit (ASIC) hardware devices. Program components implemented as machine learning models, such as program components 202, 206, 210, 214, 218, 222, 226, 230, 234, 238, among others, may be implemented in an Artificial Intelligence (AI) hardware accelerator.

In certain embodiments, program components 202, 206, 210, 214, 218, 222, 226, 230, 234, 238, among others, may use machine learning and deep learning algorithms, such as decision tree learning, association rule learning, neural network, inductive programming logic, support vector machines, Bayesian network, Recurrent Neural Networks (RNN), Feedforward Neural Networks, Convolutional Neural Networks (CNN), Deep Convolutional Neural Networks (DCNNs), Generative Adversarial Network (GAN), etc. For artificial neural network program implementations, the neural network may be trained using backward propagation to adjust weights and biases at nodes in a hidden layer to produce their output based on the received inputs which may comprise the inputs received during operations by the machine learning models 202, 206, 210, 214, 218, 222, 226, 230, 234, 238. In backward propagation used to train a neural network machine learning module, biases at nodes in the hidden layer are adjusted accordingly to produce the desired output based on the received inputs which may comprise the inputs received during operations by the machine learning models 202, 206, 210, 214, 218, 222, 226, 230, 234, 238.

For instance, the NLP sentence parser 206 machine learning model may be trained to output a structured sentence representation 208 from a text sentence 204; the text summarizer 214 machine learning model may be trained to output a summary 216 of the object of recognition in the text that has a high confidence level of being correct; the object of recognition classifier 210, comprising a machine learning model, may be trained to output a recognition classification, with a high confidence level, indicating a high probability the classification is correct that the object of the sentence has a recognition type 212 comprising an object of recognition, i.e., something to recognize in the virtual meeting, or is not an object of recognition; the object classifier 218 machine learning model may be trained to output object points 220 for the object in the sentence, with a high confidence level, indicating an extent to which the object of the sentence should receive attention; a sentiment analyzer 222 machine learning model may be trained to produce sentiment points 224 for the sentence indicating an extent of a strength of the sentiment toward the subject and/or object of recognition in the sentence, with a high confidence level, such as mild praise or criticism through ebullient praise or harsh criticism of the object of recognition; a value classifier 226 machine learning model may be trained to produce value points 228, with a high confidence level, indicating a quantization of a value associated with the object, such as an amount of an award, penalty amount, other fees paid, etc.; the named entity classifier 234 machine learning model may be trained to produce a predefined name classification 236 for the subject of the sentence with a high confidence level. The machine learning models, 202, 206, 210, 214, 218, 222, 226, 230, 234, 238, among others, may be trained with labeled or unlabeled data indicating user approval or disapproval of the output.

The program components 202, 206, 210, 214, 218, 222, 226, 230, 234, 238, among others, may be trained to produce their output from feedback and their output based on the input. Backward propagation may comprise an algorithm for supervised learning of artificial neural networks using gradient descent. Given an artificial neural network and an error function, the method may use gradient descent to find the parameters (coefficients) for the nodes in a neural network or function that minimizes a cost function measuring the difference or error between actual and predicted values for different parameters. The parameters are continually adjusted during gradient descent to minimize the error.

In backward propagation used to train a neural network machine learning module, such as the program components 202, 206, 210, 214, 218, 222, 226, 230, 234, 238, margin of errors are determined based on a difference of the calculated predictions and user rankings of the output. Biases (parameters) at nodes in the hidden layer are adjusted accordingly to minimize the margin of error of the error function.

In an alternative embodiment, the components 202, 206, 210, 214, 218, 222, 226, 230, 234, 238 may be implemented not as a machine learning module, but implemented using a rules based system to determine the outputs from the inputs. The components 202, 206, 210, 214, 218, 222, 226, 230, 234, 238 may further be implemented using an unsupervised machine learning module, or machine learning implemented in methods other than neural networks, such as multivariable linear regression models.

The functions described as performed by the program components 106, 108, 122, 200, 202, 206, 210, 214, 218, 222, 226, 234, 230, 234, 238, among others, may be implemented as program code in fewer program modules than shown or implemented as program code throughout a greater number of program modules than shown.

The participant computing device 104 may comprise a personal computing device, such as a laptop, desktop computer, tablet, smartphone, wearable computer, etc. The virtual meeting server 100 may comprise one or more server class computing devices, or other suitable computing devices.

Figure 3:
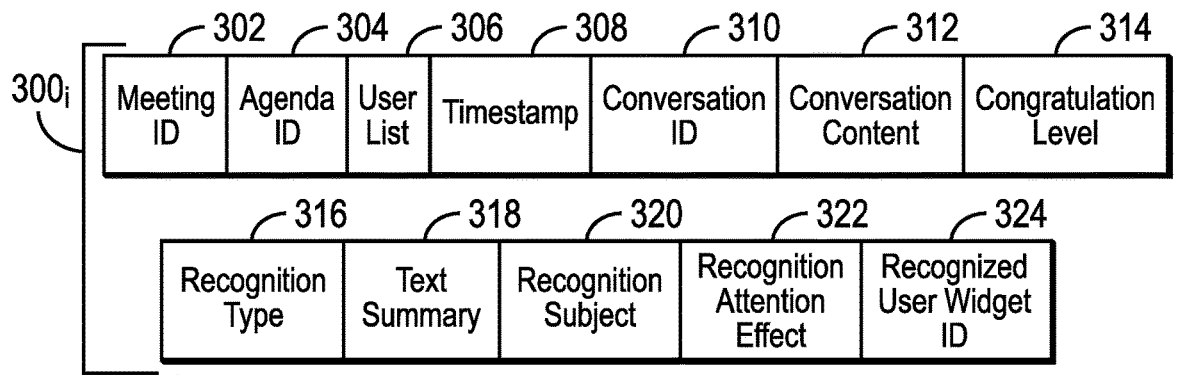
FIG. 3 illustrates an embodiment of a conversation log entry having information on a sentence inputted into the virtual meeting.

FIG. 3 illustrates an embodiment of a conversation log entry $300_i$ in the conversation log 300 having information on a detected sentence from a participant $116_i$, moderator or observer of the virtual meeting environment 108, and includes: a meeting identifier (ID) 302 identifying the virtual meeting environment 108; an agenda ID 304 indicating a topic to be discussed during the meeting 302; a user list 306 of participants $116_1$, $116_2$ . . . $116_n$ in the meeting 302; a timestamp 308 when the sentence represented by the log entry $300_i$ was detected; a conversation ID 310 providing a unique identifier of the sentence or conversation detected in the virtual meeting environment 108; conversation content 312, such as the text representation of the actual sentence; a congratulation level 314 outputted by the recognition bot 200 indicating a level or extent of congratulation that should be rendered in the meeting 108; a recognition type 316, such as whether the object of the sentence is an object of recognition or not an object of recognition, i.e., no accolade or praise needed; a text summary 318 comprising text summary 216; a recognition subject 320 comprising the participant to recognize; an attention effect 322 comprising the output recognition attention effect 114; and a recognized user widget ID 324 in the virtual meeting representing the recognition subject 320.

Figure 4A:
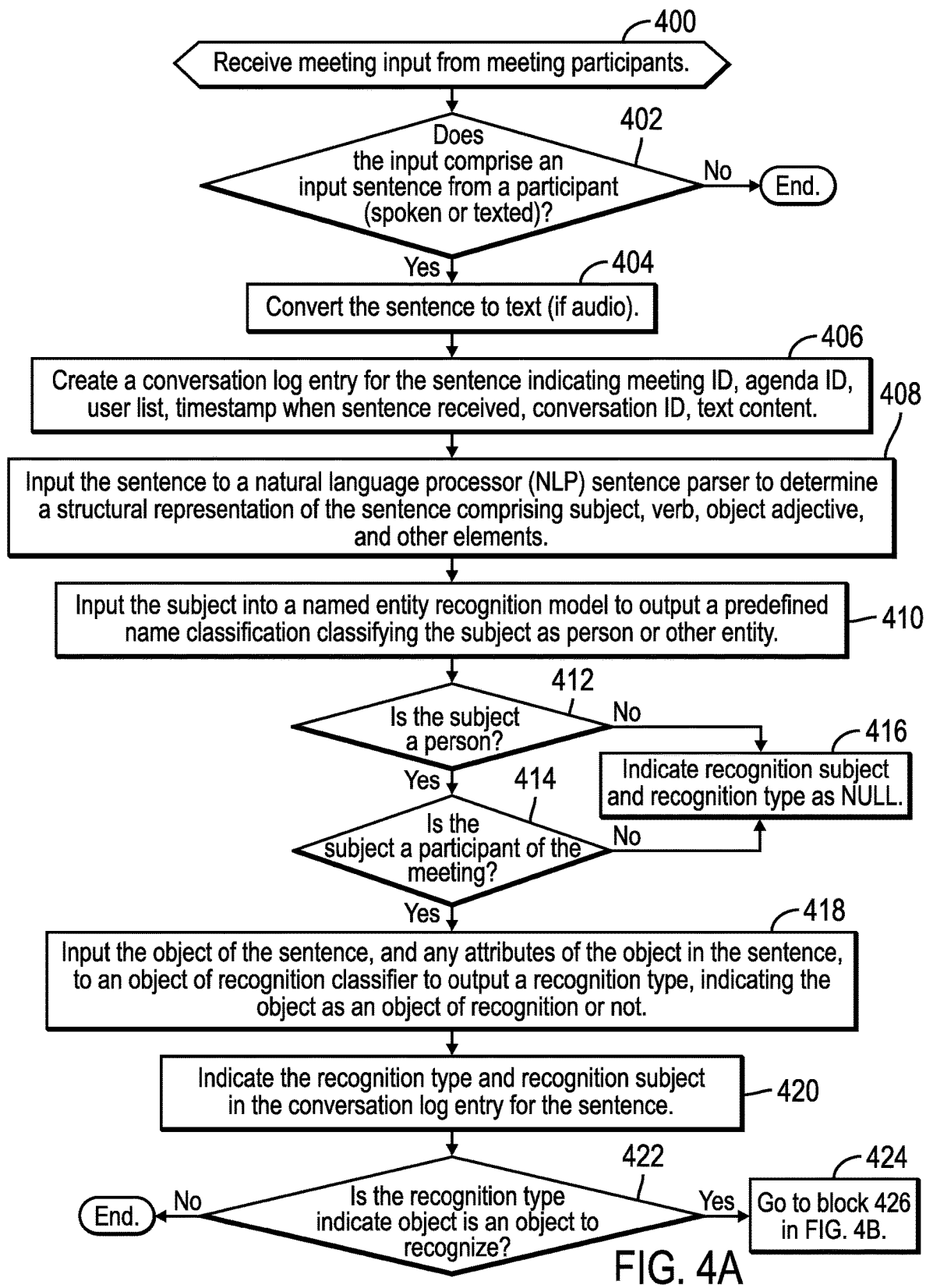
FIGS. 4A and 4B illustrate an embodiment of operations to determine a recognition attention effect to render in the virtual meeting for objects of recognition included in sentences inputted into the virtual meeting.
Figure 4B:
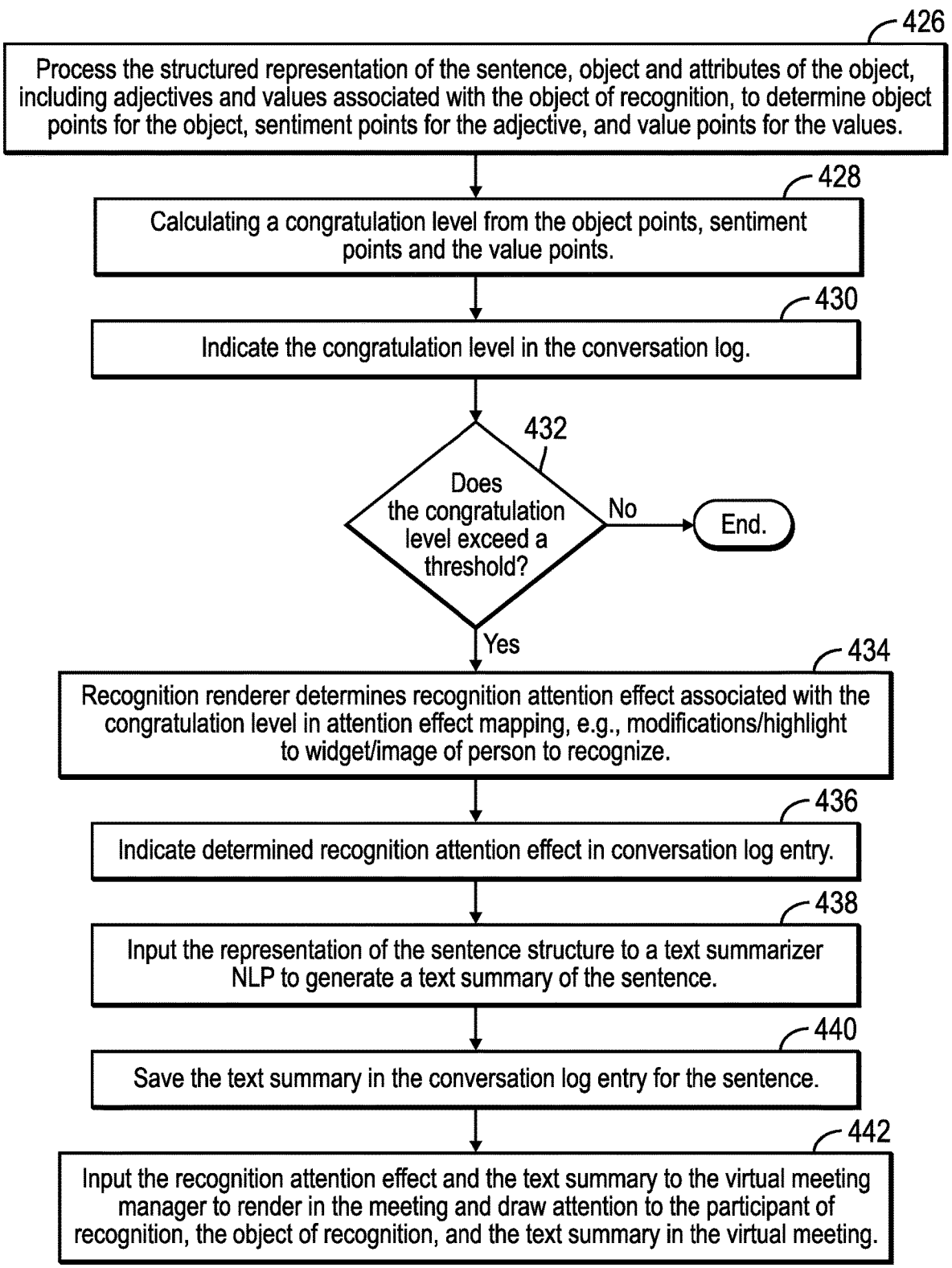

FIGS. 4A and 4B illustrate an embodiment of operations performed by the recognition bot 200 and components therein to processing real-time meeting input 110 to determine a recognition attention effect 114 to render in the virtual meeting environment 108. Upon receiving (at block 400) real-time meeting input 110, the recognition monitor 202 determines (at block 402) whether the input comprises an input sentence from a participant $116_i$, audio or text input. If (at block 402) the input 110 does not comprise a sentence, control ends. If (at block 402) the real-time meeting input 110 comprises a sentence, then the recognition monitor 202 converts (at block 404) the sentence to text 204 if the real-time meaning input 110 comprises audio. The recognition monitor 202 may create (at block 406) a conversation log entry $300_i$ in the conversation log 300 for the text sentence 204 indicating meeting ID 302, agenda ID 304, user list 306, timestamp 308 when sentence received, conversation ID 310 uniquely identifying the sentence 204, and a conversation content 312 comprising the text sentence 204. The text sentence 204 is inputted (at block 408) to a natural language processor (NLP) sentence parser 206 to determine a structural representation 208 of the sentence comprising subject, verb, object adjective, and other elements. The subject from the structural representation 208 of the text sentence 204 is inputted (at block 410) into a named entity recognition model 234 to output a predefined name classification 236 classifying the subject as a person or other entity.

For instance, for a text sentence 204 of "Mike did excellent job in the Q1 and received three innovation awards, got $5000 dollar awards in Q1", the NLP sentence parser 206 may identify: the subject "Mike"; the verbs "did" and "received", the objects of "job", "three motivation awards", and "$5000 dollar awards"; and adjective "excellent". The categorization of the sentence into subject, verb, object, adjective, and other categories provides a structured representation of the sentence that can be used as inputs to the series of machine learning model classifiers to determine the congratulation level and participant to recognize.

For instance, the named entity recognition model 234 identifies that "Mike" is a person and "$5000 dollar awards" is a monetary value. The sentiment analyzer 222 may determine the sentiment of the sentence by analyzing the adjective "excellent" and the overall context of the sentence 204. The text summarizer 214 may generate a summary of the sentence by extracting the most important elements, such as "Mike received three innovation awards and $5000 dollar awards in Q1". Further, a machine translator (not shown) may translate the text sentence 204 or summary of the text 216 into another language by using the structured representation 208 to maintain the meaning and structure of the sentence. A question answering module may also use the structured representation 208 to answer questions such as "What did Mike receive in Q1?" or "Who received three innovation awards?" Overall, the structured representation 208 of the sentence allows NLP and machine learning modules to perform a wide range of tasks and analyses, enabling a deeper understanding and processing of the language.

If (at block 412) the subject is a person, according to the named entity recognition model 234, and if (at block 414) the subject is a participant of the meeting, such as indicated in the user list 306 of the conversation log entry $300_i$, then the object of the sentence, and any attributes of the object in the sentence, are inputted (at block 418) to the object of recognition classifier 210 to output a recognition type 212, indicating whether the object is an object of recognition or not. The recognition type 212 and recognition subject are indicated (at block 420) in the conversation log entry $300_i$ for the sentence 204. If (at block 412) the subject is not classified as a person or if (at block 414) the subject is not a participant in the meeting 108, then the recognition subject 320 and recognition type 316 are indicated as NULL and control ends, as there is no object of recognition to recognize and no praise to make in the virtual meeting environment 108.

If (at block 422) the recognition type 212 indicates that the object is not an object to recognize, then control ends. If (at block 422) the recognition type 212 is an object to recognize, e.g., an award, noteworthy milestone or action by the participant to recognize, then control proceeds (at block 424) to block 426 in FIG. 4B. With respect to FIG. 4B, the recognition bot 200 processes (at block 426) the structured sentence representation 208, e.g., the sentence, object and attributes of the object, including adjectives and values associated with the object of recognition, to determine object points 220 for the object, sentiment points 222 for the adjective, and value points 228 for the values. The congratulation level classifier 230 calculates (at block 428) a congratulation level 232 from the object points 220, sentiment points 222, and the value points 228. The congratulation level 232 is indicated (at block 430) in field 314 in the conversation log entry $300_i$.

If (at block 432) the congratulation level 232 does not exceed a threshold level of sufficient congratulation, then control ends. If (at block 432) the congratulation level does exceed a threshold level, then the recognition renderer 238 determines (at block 434) the recognition attention effect 114 associated with the congratulation level 232 in the attention effect mapping 240. The recognition attention effect 114 is indicated (at block 436) in field 322 in the conversation log entry $300_i$, e.g., attention visualizations, to direct attention to the person to recognize and the object of recognition. The structured representation of the sentence 208 is inputted (at block 438) to the text summarizer 214 to generate a text summary 216 of the sentence 204. The text summary 216 is saved (at block 440) in field 318 in the conversation log entry $300_i$ for the sentence. The recognition attention effect 114 and the text summary 216 are inputted (at block 442) to the virtual meeting manager 106 to render in the meeting 108 and draw attention to the participant of recognition, the object of recognition, and the text summary 216 in the virtual meeting environment 108.

With the embodiment of FIGS. 4A and 4B, the recognition bot 200 monitors real-time meeting input 110 from participants to the virtual meeting environment 108 to detect sentences describing a level of some accolade and acknowledgement of a participant in the meeting, such as a notable achievement, award, life or work milestone, etc. The described embodiments provide a combination of specific machine learning models and NLPs to process different components of the sentence to determine if there is an object of recognition and participant of the virtual meeting to praise, and then determine a level of attention in the form of a recognition attention effect to render in the virtual meeting environment 108 to direct participant attention to the object of recognition and the participant to recognize. In this way, described embodiments provide improved technology to automate enhancement of the virtual meeting experience and user involvement by offering recognition and praise of certain meeting participants.

Figure 5:
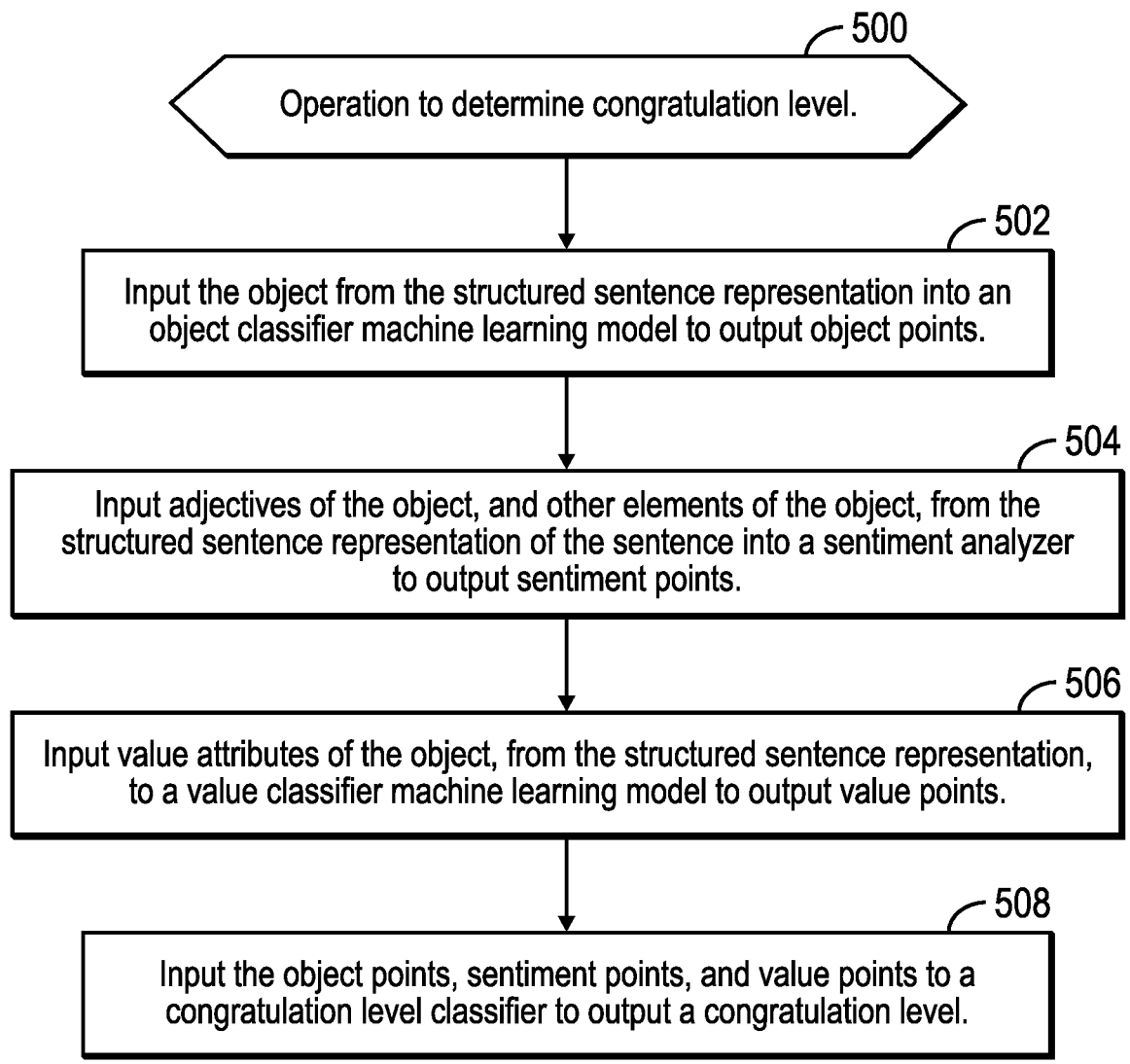
FIG. 5 illustrates an embodiment of operations to determine a congratulation level for an objection of recognition in a sentence.

FIG. 5 illustrates an embodiment of operations to determine the congratulation level 232 with the object classifier 218, sentiment analyzer 222, and value classifier 226 machine learning models. Upon initiating (at block 500) the operation to determine the congratulation level 232, such as at block 426 in FIG. 4B, the object of the structured sentence representation 208 is inputted (at block 502) into an object classifier machine learning model 218 to output object points 220. The adjectives of the object, and other elements of the object, in the structured sentence representation 208 are inputted (at block 504) of the sentence into the sentiment analyzer 222 to output sentiment points 224. The value attributes of the object, from the structured sentence representation, are inputted (at block 506) to a value classifier machine learning model 226 to output value points 228. The object points 220, sentiment points 224, and value points 228 are inputted (at block 508) to a congratulation level classifier 230 to output a congratulation level 232.

Described embodiments provide an improved configuration of specific machine learning models trained to generate points for different elements of the structured sentence representation, such as the object, sentiment points, and the value points 228. Further processing is optimized, because the different machine learning classifiers 218, 222, and 226, which may be implemented in artificial intelligence (AI) accelerator hardware, may in parallel generate the specific different type of points 220, 224, 228 that are fed into the congratulation level 232. This parallel processing of the components that are aggregated to form the congratulation level reduces latency in rendering the recognition attention effect 114 in the virtual meeting environment 108.

Figure 6A:
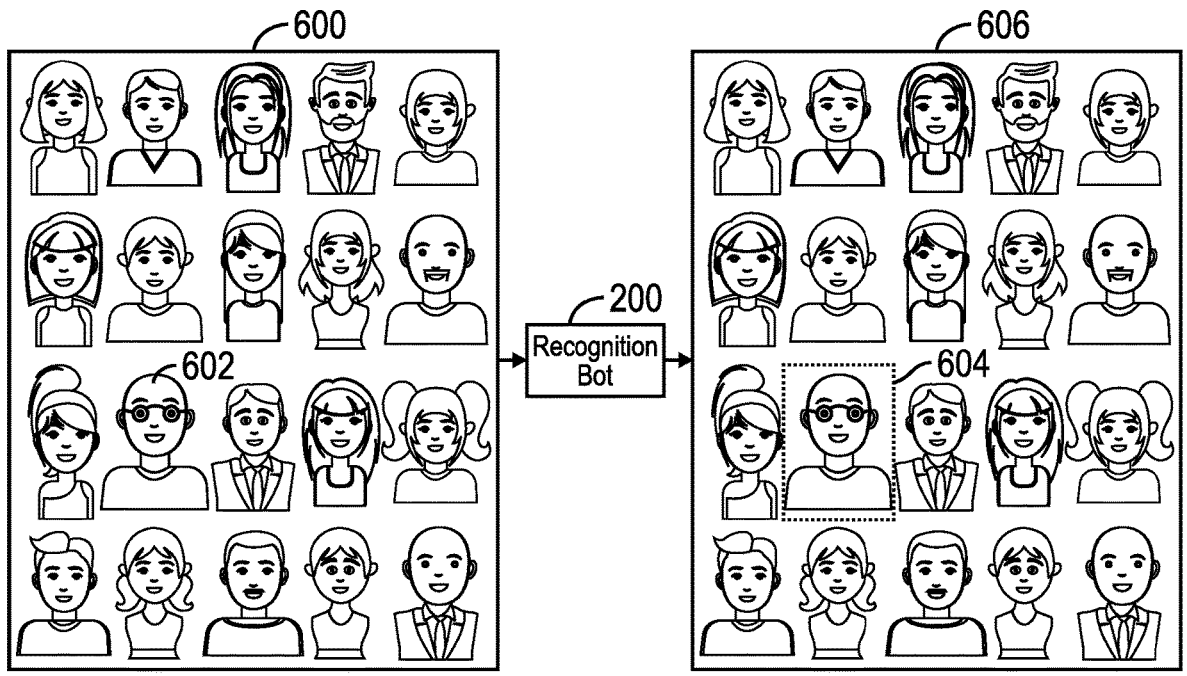
FIGS. 6A and 6B illustrate examples of recognition attention effects rendered in the virtual meeting.
Figure 6B:
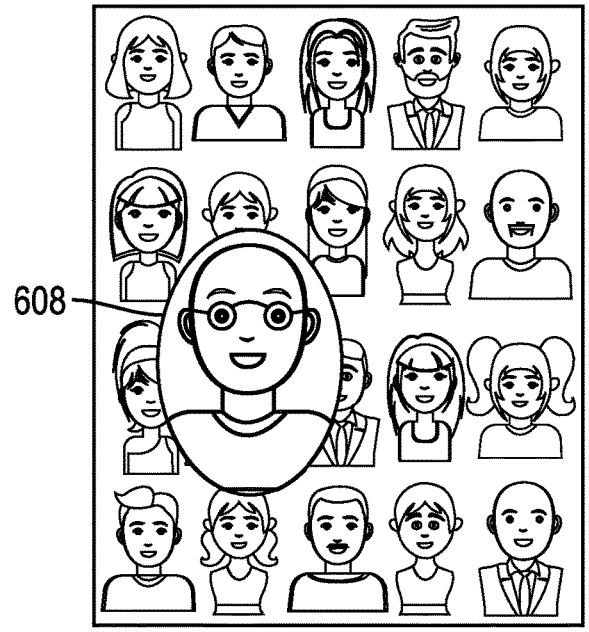

FIGS. 6A and 6B provide illustrations of how the recognition attention effect may modify representations of the participant of recognition to provide attribution and acknowledgment. In FIG. 6A, a panel 600 with representations of the participants, including participant 602, without any highlights or alterations to direct attention to the participants. The recognition bot 200 upon recognizing an object of recognition for participant 602, may generate the recognition attention effect 114 to control the virtual meeting manager 106 to generate a visualization to highlight participant 602 with an effect of a golden glow 604 in a new rendering of the panel 606 to draw attention to participant 602 who is receiving recognition and celebration for some accomplishment or milestone in life or at work. The attention effect 604 renders participant 602 differently than the other participants to draw attention to participant 602 for recognition.

FIG. 6B illustrates a further effect 608 rendered with respect to the participant 602, where the effect 608 comprises an enlarged and circled representation of the participant 602 to further draw attention to participant 602.

FIGS. 7A and 7B illustrate an example of conversation log entries 700 comprising instances of the conversation log entry $300_i$. Each row of the table 700 comprises a conversation log entry $700_i$ at a different instance of time, denoted time-1, time-2, et seq. The columns of the table 700 corresponding to the fields of a conversation log entry $300_i$, shown in FIG. 3, and are labeled with the corresponding fields from the conversation log entry $300_i$. FIGS. 7A and 7B show the progression of entries in the conversation log 300. When the sentence is first received, entry $700_2$ is created having the sentence and before the other information is determined. In entry $700_3$, the NLP sentence parser 206 parses the conversation content 312 to show the different elements of the sentence; the recognition bot 200 determines that "Mike" is the recognition subject 320 and the recognition type 316 of "Recognition". In entry $700_4$, the congratulation level classifier 230 determines a congratulation level 314 of "11"; the recognition renderer 238 determines the recognition attention effect 322 as "Golden Background", such as shown as background 604 in FIG. 6A; and the widget ID 324 indicates the "widget (Mike)", also shown as widget 602 in FIG. 6A.

Entries $700_5$ and $700_6$ show new sentences of conversation content 312 of participants congratulating Mike and the recognition attention effect 322 changes in entries $700_5$ and $700_6$ to provide different visualization effects for Mike's widget 324. The different shown visualization effects may be a sequence of visualization effects applied to Mike's widget over time to redirect participants to Mike by changing the visualization effect from "Golden Background" 605 to "centralized position and enlarged size" 608 and then finally to "jiggle" in a progression to continue to draw participant attention to Mike's widget in the view. For instance, FIG. 6B shows a visualization 604 of golden background 604 for Mike's widget and FIG. 6C shows the progression to a centralized position and enlarged size visualization effect 608. At entry $700_7$, the conversation moves onto another topic, with fields 320, 314, 314, 322, and 324 all NULL as the new conversation has nothing to do with providing praise or accolades to a participant.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 8:
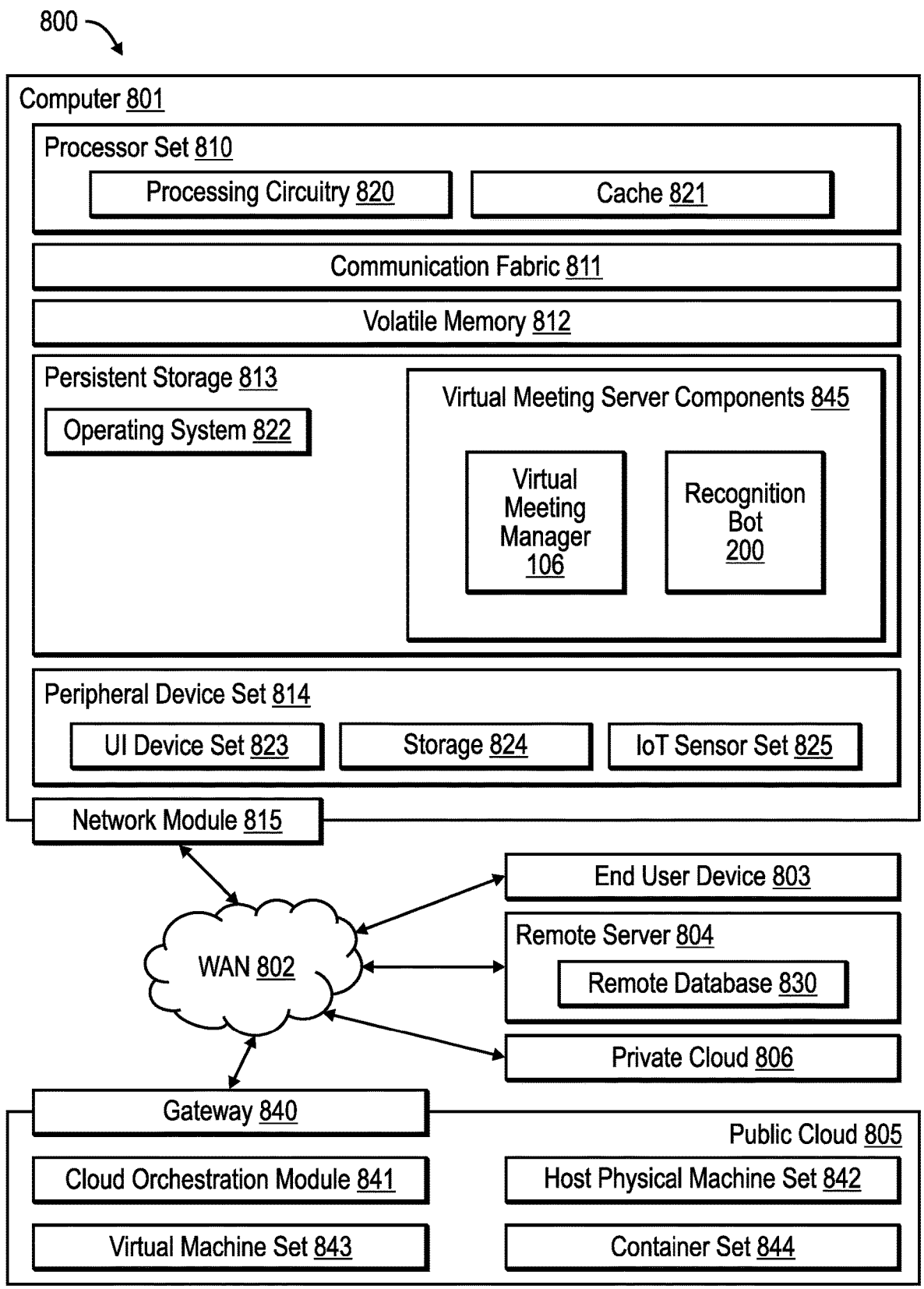
FIG. 8 illustrates a computing environment in which the components of FIGS. 1 and 2 may be implemented.

With respect to FIG. 8, computing environment 800 contains an example of an environment for the execution of at least some of the computer code of the virtual meeting server components 845 involved in performing the inventive methods to determine input in a virtual meeting providing an object of recognition for a participant to recognize and generate a recognition attention effect to draw participant attention towards the participant to recognize, including the virtual meeting manager 106 and recognition bot 200, as described with respect to FIGS. 1 and 2. In addition to block 845, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 845, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be 845 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 845 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may comprise the participant computing device 104 (FIG. 1), and may be implemented as a client device, such as thin client, heavy client, mainframe computer, desktop computer, smartphone, wearable computer, and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The letter designators, such as i and n, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for generating information in a virtual meeting having participants, the computer program product comprising a computer readable storage medium having computer readable program code embodied therein that is executable to perform operations, the operations comprising:
   processing, by a natural language processor (NLP), a sentence to determine a structural representation of the sentence comprising a subject and object;
   processing the structural representation of the sentence to determine whether the object of the sentence comprises an object of recognition and the subject of the sentence comprises a participant in the virtual meeting;
   processing the structural representation of the sentence to determine an attention level in response to determining that the structural representation of the sentence includes the object of recognition and the subject comprises a participant in the virtual meeting; and
   in response to the attention level exceeding a threshold, rendering a recognition attention effect in the virtual meeting associated with the attention level, observable by the participants of the virtual meeting, to direct attention of the participants of the virtual meeting toward the participant that is the subject of the sentence.

2. The computer program product of claim 1, wherein the attention level and the recognition attention effect are associated with an attention type that is a member of attention types consisting of: congratulatory attention; derisive attention; sarcastic attention; disapproval attention; cautionary tale attention; and notification attention.

3. The computer program product of claim 1, wherein the structural representation of the sentence further includes an adjective, wherein the NLP further determines a value associated with the object of recognition, wherein the determining the attention level further comprises:
   processing the object, adjective, and value in the structural representation of the sentence to determine object points, sentiment points, and value points; and
   determining, by an attention level classifier, the attention level as a function of the object points, the sentiment points, and the value points.

4. The computer program product of claim 3, wherein the processing to determine the object points, the sentiment points, and the value points further comprises:
   processing, by an object classifier machine learning model, the object to output the object points from input comprising the object in the sentence;

processing, by a sentiment analyzer machine learning model, the adjective to output the sentiment points from input comprising the adjective in the sentence; and processing, by a value classifier machine learning model, a value for the object in the sentence to output the value points from input comprising the value for the object in the sentence.

5. The computer program product of claim 1, wherein the operations further comprise:

processing, by an object of recognition classifier, comprising a machine learning model, input comprising the object in the sentence and attributes of the object in the sentence to classify the object in the sentence as an object of recognition or not an object of recognition, wherein the operations of determining the attention level, determining whether the attention level exceeds the threshold, and the rendering the recognition attention effect are performed in response to determining that the object in the sentence comprises the object of recognition.

6. The computer program product of claim 1, wherein the operations further comprise:

providing an attention effect mapping associating different attention levels with different attention effects to render in the virtual meeting, wherein a first attention level, which is higher than a second attention level, is associated with a first attention effect that provides more noticeable effects in the virtual meeting than a second attention effect associated with the second attention level.

7. The computer program product of claim 1, wherein the recognition attention effect specifies visualization modifications of a representation of the participant that is the subject of the sentence to draw participants' attention to a widget representing the participant that is the subject of the sentence.

8. The computer program product of claim 1, wherein the operations further comprises:

summarizing, by a text summarizer NLP, the sentence to output a summary of the sentence identifying the subject, the object of recognition associated with the subject, and a value associated with the object of recognition; and rendering the summary of the sentence with the rendering of the recognition attention effect in the virtual meeting.

9. The computer program product of claim 1, wherein the operations further comprise:

generating a conversation log entry in a conversation log for each sentence processed in the virtual meeting to include: a content of the sentence; the structural representation of the sentence; indication of whether the sentence includes an object of recognition; indication of whether the subject of the sentence comprises a participant of the virtual meeting; a recognitive attention effect if the sentence includes the object of recognition; and a timestamp of when the sentence was presented to the virtual meeting, wherein the recognition attention effect indicated in the conversation log entry is rendered in the virtual meeting to highlight the object of recognition for the participant to recognize.

10. A system for generating information in a virtual meeting having participants, comprising:

a natural language processor (NLP) to process a sentence to determine a structural representation of the sentence comprising a subject and object;

a processor;

a computer readable storage medium having computer readable program code embodied therein that is executable by the processor to perform operations, the operations comprising:

processing the structural representation of the sentence to determine whether the object of the sentence comprises an object of recognition and the subject of the sentence is a participant in the virtual meeting;

processing the structural representation of the sentence to determine an attention level in response to determining that the structural representation of the sentence includes the object of recognition and the subject comprises a participant in the virtual meeting; and in response to the attention level exceeding a threshold, rendering a recognition attention effect in the virtual meeting associated with the attention level, observable by the participants of the virtual meeting, to direct attention of the participants of the virtual meeting toward the participant that is the subject of the sentence.

11. The system of claim 10, wherein the structural representation of the sentence further includes an adjective, wherein the NLP further determines a value associated with the object of recognition, wherein the determining the attention level further comprises:

processing the object, adjective, and value in the structural representation of the sentence to determine object points, sentiment points, and value points; and determining, by an attention level classifier, the attention level as a function of the object points, the sentiment points, and the value points.

12. The system of claim 11, wherein the processing to determine the object points, the sentiment points, and the value points further comprises:

processing, by an object classifier machine learning model, the object to output the object points from input comprising the object in the sentence;

processing, by a sentiment analyzer machine learning model, the adjective to output the sentiment points from input comprising the adjective in the sentence; and processing, by a value classifier machine learning model, a value for the object in the sentence to output the value points from input comprising the value for the object in the sentence.

13. The system of claim 10, wherein the operations further comprise:

processing, by an object of recognition classifier, comprising a machine learning model, input comprising the object in the sentence and attributes of the object in the sentence to classify the object in the sentence as an object of recognition or not an object of recognition, wherein the operations of determining the attention level, determining whether the attention level exceeds the threshold, and the rendering the recognition attention effect are performed in response to determining that the object in the sentence comprises the object of recognition.

14. The system of claim 10, wherein the operations further comprise:

providing an attention effect mapping associating different attention levels with different attention effects to render in the virtual meeting, wherein a first attention level, which is higher than a second attention level, is associated with a first attention effect that provides more noticeable effects in the virtual meeting than a second attention effect associated with the second attention level.

15. The system of claim 10, wherein the recognition attention effect specifies visualization modifications of a representation of the participant that is the subject of the sentence to draw participants' attention to a widget representing the participant that is the subject of the sentence.

16. A method for generating information in a virtual meeting having participants, comprising:
processing, by a natural language processor (NLP), a sentence to determine a structural representation of the sentence comprising a subject and object;
processing the structural representation of the sentence to determine whether the object of the sentence comprises an object of recognition and the subject of the sentence is a participant in the virtual meeting;
processing the structural representation of the sentence to determine an attention level in response to determining that the structural representation of the sentence includes the object of recognition and the subject comprises a participant in the virtual meeting; and
in response to the attention level exceeding a threshold, rendering a recognition attention effect in the virtual meeting associated with the attention level, observable by the participants of the virtual meeting, to direct attention of the participants of the virtual meeting toward the participant that is the subject of the sentence.

17. The method of claim 16, wherein the structural representation of the sentence further includes an adjective, wherein the NLP further determines a value associated with the object of recognition, wherein the determining the attention level further comprises:
processing the object, adjective, and value in the structural representation of the sentence to determine object points, sentiment points, and value points; and
determining, by an attention level classifier, the attention level as a function of the object points, the sentiment points, and the value points.

18. The method of claim 16, further comprising:
processing, by an object of recognition classifier, comprising a machine learning model, input comprising the object in the sentence and attributes of the object in the sentence to classify the object in the sentence as an object of recognition or not an object of recognition, wherein the determining the attention level, determining whether the attention level exceeds the threshold, and the rendering the recognition attention effect are performed in response to determining that the object in the sentence comprises the object of recognition.

19. The method of claim 16, further comprising:
providing an attention effect mapping associating different attention levels with different attention effects to render in the virtual meeting, wherein a first attention level, which is higher than a second attention level, is associated with a first attention effect that provides more noticeable effects in the virtual meeting than a second attention effect associated with the second attention level.

20. The method of claim 16, wherein the recognition attention effect specifies visualization modifications of a representation of the participant that is the subject of the sentence to draw participants' attention to a widget representing the participant that is the subject of the sentence.

* * * * *